(12) United States Patent
Tabachnyk et al.

(10) Patent No.: US 12,353,850 B2
(45) Date of Patent: *Jul. 8, 2025

(54) AUGMENTATION OF CODE COMPLETION AND CODE SYNTHESIS WITH SEMANTIC CHECKING

(71) Applicant: Google LLC, Mountain View, CA (US)

(72) Inventors: Maxim Tabachnyk, Munich (DE); Yurun Shen, Mountain View, CA (US); Stoyan Stefanov Nikolov, Planegg (DE); Stanislav Pyatykh, Unterhaching (DE); Ksenia Korovina, Mountain View, CA (US); Evgeny Gryaznov, Mountain View, CA (US); Erik Grabljevec, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,473

(22) Filed: Dec. 11, 2023

(65) Prior Publication Data

US 2024/0111497 A1     Apr. 4, 2024

Related U.S. Application Data

(63) Continuation of application No. 17/657,113, filed on Mar. 29, 2022, now Pat. No. 11,861,333.

(51) Int. Cl.
*G06F 8/33* (2018.01)
(52) U.S. Cl.
CPC ..................... *G06F 8/33* (2013.01)
(58) Field of Classification Search
None
See application file for complete search history.

(56) References Cited

U.S. PATENT DOCUMENTS

| | | | |
|---|---|---|---|
| 6,311,324 B1 * | 10/2001 | Smith ................ | G06F 11/3409 717/130 |
| 8,387,004 B2 * | 2/2013 | Beckman ................ | G06F 8/20 717/109 |

(Continued)

OTHER PUBLICATIONS

Coenen, et al., "Comparison of Feedback Strategies for Supporting Programming Learning in Integrated Development Environments (IDEs)," Springer, 2018, 12pg. (Year: 2018).*

(Continued)

*Primary Examiner* — Ryan D. Coyer
(74) *Attorney, Agent, or Firm* — Shumaker & Sieffert, P.A.

(57) ABSTRACT

A method for providing autofill suggestions in a development environment includes obtaining, from a user interface executing on a user device, a user input representing source code generated within a development environment. The source code is created using a particular programming language and a programming code base. The method further includes determining, using a machine learning model, at least one autofill suggestion based on the user input, the autofill suggestion continuing the source code represented by the user input. The method further includes determining, using a rule-based semantic checker configured for the particular programming language, whether the autofill suggestion is semantically correct based on the development environment and the programming code base. The method also includes, when the autofill suggestion is semantically correct, transmitting the autofill suggestion for display on the user interface of the user device.

19 Claims, 7 Drawing Sheets

(56) References Cited

U.S. PATENT DOCUMENTS

| | | | | |
|---|---|---|---|---|
| 2005/0114771 | A1* | 5/2005 | Piehler | G06F 40/10 |
| | | | | 715/264 |
| 2012/0102454 | A1* | 4/2012 | Burghard | G06F 8/71 |
| | | | | 717/110 |
| 2017/0371629 | A1* | 12/2017 | Chacko | G06F 8/36 |
| 2019/0188251 | A1* | 6/2019 | Liu | G06F 40/274 |
| 2021/0349696 | A1* | 11/2021 | Nupponen | G06F 8/33 |
| 2021/0374558 | A1* | 12/2021 | Tommasi | G06F 16/2228 |
| 2022/0358286 | A1* | 11/2022 | Wilson-Thomas | G06F 3/0482 |
| 2023/0116149 | A1* | 4/2023 | Radhakrishna | G06F 8/33 |
| | | | | 717/110 |
| 2023/0141807 | A1* | 5/2023 | Groenewegen | G06F 8/33 |
| | | | | 717/106 |

OTHER PUBLICATIONS

Nguyen et al., "Combining Program Analysis and Statistical Language Model for Code Statement Completion," IEEE, 2019, 11pg. (Year: 2019).*

International Search Report and Written Opinion (EPO) for Application No. PCT/US2023/016464 dated Jul. 11, 2023.

Nguyen S et al: "Combining program analysis and statistical language model for code statement completion", Proceedings of the 34th IEEE/ACM International Conference on Automated Software Engineering, IEEE, Piscataway, NJ, USA, Nov. 10, 2019, pp. 710-721, XP058472454, DOI: 10.1109/ASE.2019.00072, ISBN: 978-1-7281-2508-4 sections "I. Introduction", "II. Motivating Example" and "III. Key Ideas and Approach Overview" at pp. 710-712.

Response to Communication Pursuant to Rules 161(1) and 162 EPC dated Nov. 7, 2024, from counterpart European Application No. 23718479.1, filed May 6, 2025, 26 pp.

* cited by examiner

AUGMENTATION OF CODE COMPLETION AND CODE SYNTHESIS WITH SEMANTIC CHECKING

CROSS REFERENCE TO RELATED APPLICATIONS

This U.S. patent application is a continuation of, and claims priority under 35 U.S.C. § 120 from, U.S. patent application Ser. No. 17/657,113, filed on Mar. 29, 2022. The disclosure of this prior application is considered part of the disclosure of this application and is hereby incorporated by reference in its entirety.

TECHNICAL FIELD

This disclosure relates to generating autofill suggestions for code completion in a development environment.

BACKGROUND

Many computer applications and programs provide autofill suggestions as a convenience to the user. An autofill suggestion is presented in response to a user input and is a prediction of one or more characters to continue or complete the user input. Typically, autofill suggestions are based on previously stored information for the particular user. For example, if a user is typing in a name in a form field, the user-interface may display a pop-up window with one or more names previously entered by the user in similar form fields or contained in the current file of the user or files that the current file refers to as dependencies. The user can then select a name from the pop-up window to automatically complete the form field without entering any other additional input.

Recently, machine learning models have been adapted to generate autofill suggestions that can be used in everything from word processors to programming environments. The machine learning models may be trained on a large amount of data and not necessarily personalized to a particular user. The autofill suggestions of the machine learning model may be based on the most common words, phrases, characters, etc. corresponding to the received user input. For example, if a user enters a "G" in a subject line of an email, the user may be presented with autofill suggestions such as "Greetings" or "Good Morning."

SUMMARY

One aspect of the disclosure provides a computer-implemented method for providing autofill suggestions in a development environment. The computer-implemented method when executed by data processing hardware causes the data processing hardware to perform operations including obtaining, from a user interface executing on a user device, a user input representing source code generated within a development environment. The source code is created using a particular programming language and a programming code base. The operations include determining, using a machine learning model, an autofill suggestion based on the user input, the autofill suggestion continuing the source code represented by the user input. The operations further include determining, using a rule-based semantic checker configured for the particular programming language, whether the autofill suggestion is semantically correct based on the development environment and the programming code base. The operations include when the autofill suggestion is semantically correct, transmitting the autofill suggestion for display on the user interface of the user device.

Implementations of the disclosure may include one or more of the following optional features. In some implementations, determining whether the autofill suggestion is semantically correct includes comparing the autofill suggestion to a structural representation of the programming code base. In these implementations, the structural representation of the programming code base may be an abstract tree. Further, in these implementations the structural representation of the programming code base may be stored in a memory cache. Further, the machine learning model and the rule-based semantic checker may be co-located within a cloud computing environment.

In some implementations, the operations further include determining, using the machine learning model, a plurality of autofill suggestions based on the user input. In these implementations, for each respective autofill suggestion of the plurality of autofill suggestions, the operations include determining, using the rule-based semantic checker, whether the respective autofill suggestion is semantically correct based on the development environment and the programming code base and, when the respective autofill suggestion is semantically correct, transmitting the respective autofill suggestion for display on the user interface of the user device. In these implementations, the rule-based semantic checker may determine whether each respective autofill suggestion of the plurality of autofill suggestions is semantically correct within an allotted time budget. When the rule-based semantic checker cannot determine whether each respective autofill suggestion of the plurality of autofill suggestions is semantically correct within the allotted time budget, the operation may further include selecting a portion of the plurality of autofill suggestions to maximize coverage within the allotted time budget and, for each respective autofill suggestion of the portion of the plurality of autofill suggestions, determining, using the rule-based semantic checker, whether the respective autofill suggestion is semantically correct based on the development environment and the programming code base and, when the respective autofill suggestion is semantically correct, transmitting the respective autofill suggestion for display on the user interface of the user device. In some of these examples, determining whether each respective autofill suggestion of the plurality of autofill suggestions is semantically correct includes grouping the respective autofill suggestion with similar autofill suggestions from the plurality of autofill suggestions into one or more groups of autofill suggestions and comparing an example autofill suggestion from each group of the one or more groups of autofill suggestions to a structural representation of the programming code base.

In some implementations, when the autofill suggestion is not semantically correct, the operations include generating, using the rule-based semantic checker, one or more constraints and determining, using the machine learning model, a new autofill suggestion based on the user input and the one or more constraints. In some implementations an integration model facilitates communication between the machine learning model and the rule-based semantic checker.

Another aspect of the disclosure provides a system for providing autofill suggestions in a development environment. The system includes data processing hardware and memory hardware in communication with the data processing hardware. The memory hardware stores instructions that when executed on the data processing hardware cause the data processing hardware to perform operations. The operations include obtaining, from a user interface executing on a user device, a user input representing source code generated within a development environment. The source code is created using a particular programming language and a programming code base. The operations include determining, using a machine learning model, an autofill suggestion based on the user input, the autofill suggestion continuing the source code represented by the user input. The operations further include determining, using a rule-based semantic checker configured for the particular programming language, whether the autofill suggestion is semantically correct based on the development environment and the programming code base. The operations include when the autofill suggestion is semantically correct, transmitting the autofill suggestion for display on the user interface of the user device.

This aspect may include one or more of the following optional features. Implementations of the disclosure may include one or more of the following optional features. In some implementations, determining whether the autofill suggestion is semantically correct includes comparing the autofill suggestion to a structural representation of the programming code base. In these implementations, the structural representation of the programming code base may be an abstract tree. Further, in these implementations the structural representation of the programming code base may be stored in a memory cache. Further, the machine learning model and the rule-based semantic checker may be co-located within a cloud computing environment.

In some implementations, the operations further include determining, using the machine learning model, a plurality of autofill suggestions based on the user input. In these implementations, for each respective autofill suggestion of the plurality of autofill suggestions, the operations include determining, using the rule-based semantic checker, whether the respective autofill suggestion is semantically correct based on the development environment and the programming code base and, when the respective autofill suggestion is semantically correct, transmitting the respective autofill suggestion for display on the user interface of the user device. In these implementations, the rule-based semantic checker may determine whether each respective autofill suggestion of the plurality of autofill suggestions is semantically correct within an allotted time budget. When the rule-based semantic checker cannot determine whether each respective autofill suggestion of the plurality of autofill suggestions is semantically correct within the allotted time budget, the operation may further include selecting a portion of the plurality of autofill suggestions to maximize coverage within the allotted time budget and, for each respective autofill suggestion of the portion of the plurality of autofill suggestions, determining, using the rule-based semantic checker, whether the respective autofill suggestion is semantically correct based on the development environment and the programming code base and, when the respective autofill suggestion is semantically correct, transmitting the respective autofill suggestion for display on the user interface of the user device. In some of these examples, determining whether each respective autofill suggestion of the plurality of autofill suggestions is semantically correct includes grouping the respective autofill suggestion with similar autofill suggestions from the plurality of autofill suggestions into one or more groups of autofill suggestions and comparing an example autofill suggestion from each group of the one or more groups of autofill suggestions to a structural representation of the programming code base. In some implementations, when the autofill suggestion is not semantically correct, the operations include generating, using the rule-based semantic checker, one or more constraints and determining, using the machine learning model, a new autofill suggestion based on the user input and the one or more constraints. In some implementations an integration model facilitates communication between the machine learning model and the rule-based semantic checker.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Computer applications for code development can provide suggestions for code completion or code synthesis based on a received user input. For example, if a user begins to type in a function call, the computer application may suggest one or more ways to complete the line of code. Further, if a user begins typing code for a loop, such as a "for loop" or a "do while" loop, the computer program can provide one or more suggestions for a script (i.e., multiple lines of code) for completing the loop. These suggestions, known as autofill or auto-complete suggestions, can be generated using machine learning models trained on a large amount of previously received code.

However, there are a number of issues that arise when using large-scale machine learning models to generate autofill suggestions for code completion. For one, although machine learning models may be regularly fine-tuned or updated to improve accuracy, the suggestions provided are typically based on an out-of-date code base and subsequently less relevant. Further, the code completion suggestions produced using machine learning models are text-based, and are not generated with consideration of the content of the code and/or the suggestions. In other words, the suggestions may be unsuitable because they are not semantically correct or may have incorrect syntax.

Implementations herein include a rule-based semantic checker to check or verify that autofill suggestions are semantically and syntactically correct prior to presentation. The rule-based semantic checker may be communicatively connected to the user's development environment and code base such that the autofill suggestions can be tested against current code associated with the user.

Figure 1:
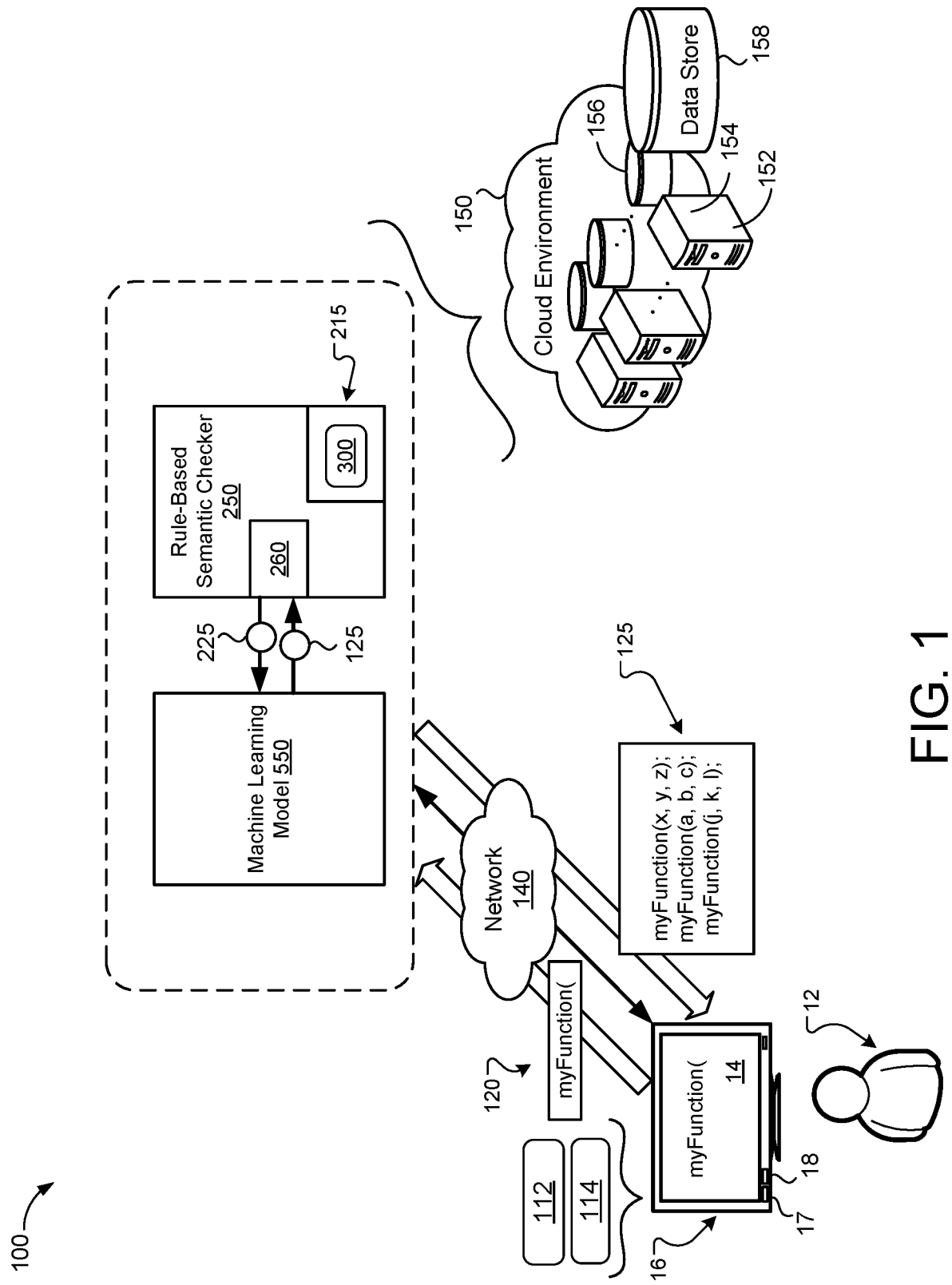
FIG. 1 is a schematic view of an example system for generating autofill suggestions for code completion in a development environment.

FIG. 1 illustrates a code suggestion system 100 including a user device 16 having a user interface 14. The user device 16 may correspond to any computing device, such as a desktop workstation, a laptop workstation, or a mobile device (i.e., a smart phone). The user device 16 includes computing resources 17 (e.g., data processing hardware) and/or storage resources 18 (e.g., memory hardware). The user device 16 may be configured to host a development environment 112 and a programming code base 114. The development environment 112, also known as an integrated development environment (IDE), is a software application that facilitates software development and creating/editing/compiling/debugging of programming code. The development environment can be specific to a particular language or can be configured to process multiple programming languages simultaneously. In some implementations, the development environment 112 executes locally on the user device 106. The programming code base 114 may include a data store of source code. For example, the code base 114 includes multiple files, libraries, modules, etc. that each support or implement one or more programs. In some implementations, the programming code base 114 includes code generated by one or more users 12. Like the development environment 112, the programming code base 114 may be stored locally (e.g., on the memory hardware 18) on the user device 16 or may be stored remotely on a server or in a cloud computing environment 150.

In some implementations, the user device 16 is in communication with a remote system 150 (also referred to herein as a cloud computing environment) via a network 140. The remote system 150 may be a single computer, multiple computers, or a distributed system (e.g., a cloud environment) having scalable/elastic resources 152 including computing resources 154 (e.g., data processing hardware) and/or storage resources 156 (e.g., memory hardware). A data store 158 (i.e., a remote storage device) may be overlain on the storage resources 146 to allow scalable use of the storage resources 146 by one or more user device 16 or the computing resources 154. The remote system 150 may execute both a machine learning model 550 and a rule-based semantic checker 250 (i.e., the machine learning model 550 and the rule-based semantic checker 250 may be co-located in the cloud computing environment 150). The development environment 112 may execute locally on the user device 16 (e.g., on the data processing hardware 17) or remotely (e.g., at the remote system 150). Likewise, the code base 114 may be stored locally at the user device 16 or stored at the remote system 150 (e.g., at the data store 158).

In some implementations, a user 12 of the user device 16 enters a user input 120 representing source code at the user device 16 via user interface 14. For example, the user 12 types, using a keyboard, "myFunction(" to begin a function call. The user device 16 may then transmit the user input 120 to the machine learning model 550 in real-time (i.e., as or shortly after the user provides the user input 120). In response to receiving the user input 120, the machine learning model 550 may be configured to generate one or more autofill suggestions 125 for code completion based on the user input 120 (i.e., a continuation or completion of the source code represented by the user input 120). The one or more suggestions 125 generated by the machine learning model 550, in some examples, are text-based and may not be indicative of the actual substance of the code (e.g., have correct syntax). Further, the machine learning model 550 may not be trained on the latest code in the programming code base 114. For example, one or more users 12 have added code to the code base 114 since the last time the machine learning model 550 was updated. In order to provide relevant suggestions 125 to the user 12, the one or more suggestions 125 are verified as being semantically and/or syntactically correct by the rule-based semantic checker 250 prior to being presented to the user 12 via the user interface 14 of the user device 16. The rule-based semantic checker 250 may verify each of the one or more suggestions 125 by performing a number of pre-defined checks for each of the one or more suggestions 125. For example, the rule-based semantic checker 250 may check, for each of the one or more suggestions 125, the resolution (e.g., does the referred object exist), the invocation (e.g., the correct number of arguments are passed to the method), the assignability (e.g., is an object of the correct type passed as a parameter), etc. The rule-based semantic checker 250 may perform the number of pre-defined checks in a pre-defined order, with the most important checks (i.e., the checks that most commonly discover errors) first. In some implementations, the rule-based semantic checker 250 performs some or all of the number of checks for each of the one or more suggestions 125 using a structural representation 300 of the programming code base 114. Optionally, when one or more suggestions 125 are not correct (e.g., have incorrect syntax), the rule-base semantic checker 250 provides one or more constraints 225 to the machine learning model 550. In turn, the machine learning model 550 may generate one or more new suggestions 125 based on the constraints 225 and the user input 120. In some implementations, the machine learning model 550 again provides the newly generated suggestions 125 to the rule based semantic checker 250 to verify that the suggestions 125 are semantically and/or syntactically correct. In this way, the rule-based semantic checker 250 may iteratively provide the machine learning model 550 with the constraints 225 to improve a quality and/or accuracy of the suggestions 125. In other implementations, the cloud environment 150 transmits the new suggestions 125 generated by the machine learning model 550 directly to the user device 16 for display in the user interface 14 without requiring the rule based semantic checker 250 to verify the newly generated suggestions 125.

In some implementations, an integration model 260 facilitates communication (e.g., via an application programming interface (API) or the like) between the machine learning model 550 and the rule-based semantic checker 250. The integration model 260 may be integrated with the rule-based semantic checker 250, as illustrated. In some implementations, the integration model 260 may be a stand-alone application also co-located within the cloud computing environment 150.

The rule-based semantic checker 250 may be programming language specific. That is, the rule-based semantic checker 250 may be configured to check semantics of suggestions 125 for a specific programming language. In some implementations, the integration model 260 is configured to determine or select an appropriate rule-based semantic checker 250 based on the language of the one or more suggestions 125. For example, the integration model 260 may receive one or more suggestions 125, and determine (e.g., via the suggestions 125, the user input 120, and/or configuration settings) that the suggestions 125 correspond to a particular programming language (e.g., C++). The integration model 260 may then transmit the suggestions 125 to a specific rule-based semantic checker 250 configured for that particular programming language (such as C++).

The rule-based semantic checker 250 may perform the number of checks for each of the suggestions 125 using a structural representation 300 of the programming code base 114. The structural representation 300 may be an abstract syntax tree, as described in greater detail below with respect to FIG. 3. In some implementations, the structural representation 300 is stored in a memory cache 215. By storing the structural representation 300 in a memory cache 215 at or near the semantic checker 250 (e.g., at the remote system 150), the rule-based semantic checker 250 can more quickly retrieve the proper structural representation 300 based on the code base 114, user input 120, suggestions 125, etc. Because latency is of prime concern in an autofill suggestion system (i.e., suggestions must appear quickly for the user 12 in order to be useful), storing the structural representation 300 in a high-speed cache in communication with the semantic checker 250 allows the semantic checker 250 to minimize latency. Further, the structural representation 300 can be updated in the memory cache 215 so that the semantic checker 250 determines proper semantics of the suggestions 125 based on the current or most recent code in the programming code base 114. When the suggestions 125 are incorrect or inappropriate, the rule-based semantic checker 250 can return one or more constraints 225 to the machine learning model 550 to be used in generating new suggestions 125.

The system of FIG. 1 is presented for illustrative purposes only and is not intended to be limiting. For example, although only a single example of each component is illustrated, any number of components 16, 112, 114, 150, 550, and 250 may be communicatively coupled to the system 100. Further, although some components are illustrated as being located in a cloud computing environment 150, in some implementations those components may be hosted locally on the user device 16. Alternatively, although some components are illustrated as being hosted on the user device 16, in some implementations those components can be hosted in a cloud computing environment 150. Further, in various implementations, some or all of the components 112, 114, 550, 250, 260, and 300 are hosted locally on user device 16, remotely (such as in cloud computing environment 150), or some combination thereof.

Figure 2:
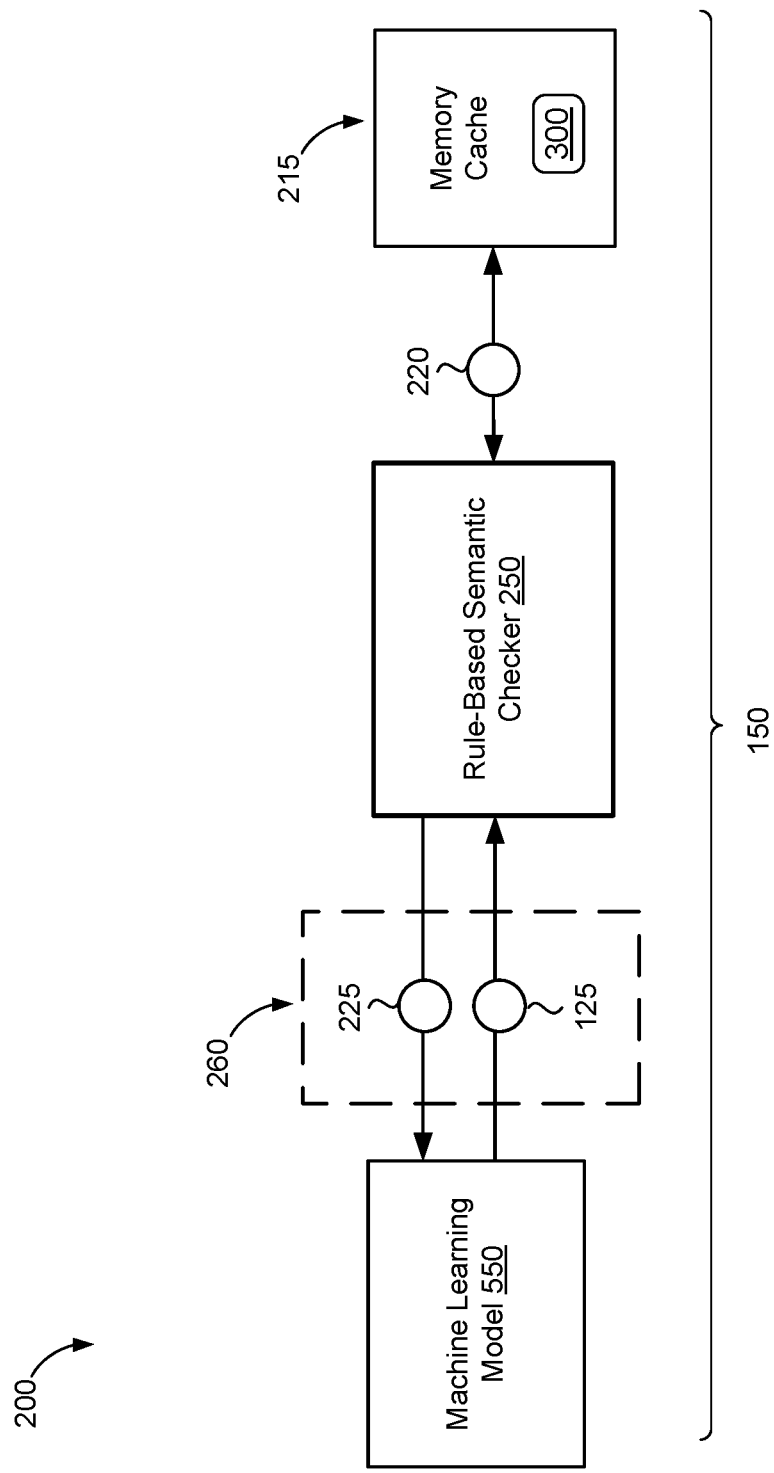
FIG. 2 is a schematic view of a rule-based semantic checker communicating with a machine learning model.

FIG. 2 is an exemplary schematic view 200 where the machine learning model 550 and the rule-based semantic checker 250 are co-located in the cloud computing environment 150 of FIG. 1. Here, the machine learning model 550 provides the suggestions 125 to the rule-based semantic checker 250. The rule-based semantic checker 250 then accesses the memory cache 215 to determine whether the appropriate structural representation 300 is available in the cache 215. The appropriate structural representation 300 may be based on the code base 114. When the structural representation is available, the semantic checker 250 retrieves the structural representation 300 of the programming code base 114. As discussed in more detail below, the rule-based semantic checker 250 determines whether the one or more suggestions 125 are semantically and/or syntactically correct. In some implementations, when the suggestions 125 are not semantically and/or syntactically correct, the rule-based semantic checker 250 returns a number of constraints 225 that the machine learning model 550 uses to generate new suggestions 125. In other implementations, when at least one suggestion is semantically and/or syntactically correct, the rule-based semantic checker 250 returns a confirmation that the correct suggestions 125 can be displayed to the user. In still further implementations, the rule-based semantic checker 250 returns an indication that one or more suggestions 125 can be displayed to a user in addition to a number of constraints 225 for the machine learning model 550 to use in determining new suggestions 125. The integration model 260 may facilitate the communications between the machine learning model 550 and the rule-based semantic checker 250.

Figure 3:
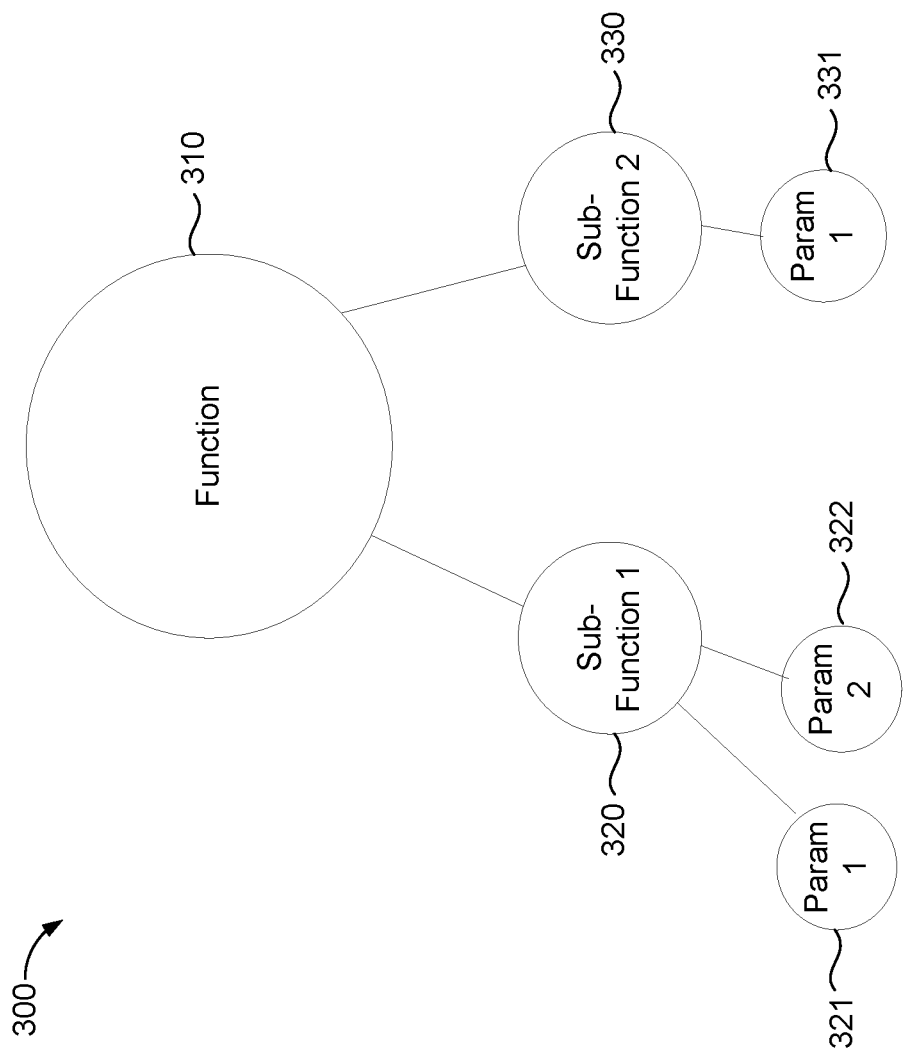
FIG. 3 is a schematic view of an example abstract syntax tree.

FIG. 3 is a schematic view of an example structural representation 300 of the programming code base 114. In this example, the structural representation 300 is in the form of an abstract syntax tree. The example of FIG. 3 is a simplified version of an abstract syntax tree for illustrative purposes. Here, the programming code base 114 of FIG. 1 includes a function 310 made up of a first sub-function 320 and a second sub-function 330. The first sub-function 320 requires two parameters 321, 322 and the second sub-function 330 requires a single parameter 331. Using the example structural representation 300 of FIG. 3, a rule-based semantic checker 250 may quickly make a number of checks to determine whether suggestions 125 corresponding to function 310 are semantically and syntactically correct. For example, function 310 requires three parameters 321, 322, and 331. Thus, any suggestions 125 corresponding to function 310 that has more or less than three parameters in the call will be incorrect (i.e., such suggestions 125 would fail a method invocation check). Additionally or alternatively, the structural representation may provide specific information along the branches of the abstract syntax tree regarding components of the code. For example, the parameter 331 is an integer, while parameter 322 is a text string. In this example, when one or more suggestions 125 invoke parameters that are not of the correct type (e.g., a Boolean), the rule-based semantic checker 250 can quickly determine that those suggestions 125 are not correct (i.e., such suggestions 125 would fail an assignability check). In another example, an autofill suggestion 125 may include "FunctionA(a,b,c)." The rule-based semantic checker 250 may traverse the structural representation 300 to determine if such a function exists in the programming code base 114. Here, the example structural representation 300 does not include "FunctionA( )" and would determine that the autofill suggestions 125 of "FunctionA(a,b,c)" is incorrect (i.e., such suggestions 125 would fail a resolution check).

In some implementations, the rule-based semantic checker 250 is constrained to determining if the suggestions 125 are correct within an allotted time budget. As the suggestions 125 are intended to be displayed to the user in real time, the check must be performed quickly enough that the suggestions 125 can be presented to the user while still relevant. Accordingly, the rule-based semantic checker 250 may be constrained to verify suggestions 125 quickly and efficiently. For example, if the rule-based semantic checker 250 uses 20 different pre-defined checks for each suggestion 125 for complete verification, the rule based semantic checker 250 will only perform a subset of checks, such as the top three checks that maximizes coverage of finding errors in suggestions 125, for each suggestion 125 that can be performed in the allotted time budget. Additionally, the rule-based semantic checker 250 may perform checks on one or more suggestions 125 in parallel to save time.

In another example, when the rule-based semantic checker 250 receives a large number of suggestions 125, it may be inefficient to check each suggestion 125 individually. One way to expedite the check performed by the rule-based semantic checker 250 is to group like suggestions 125, and only perform a check on a representative suggestion 125 from each group. For example, the rule-based semantic checker 250 receives a number of suggestions 125 that include "Function(a,b)," "Function(y,z)," "Function(a,b,c)," and "Function(x,y,z)" each representing calling a function with two or three parameters.

Here, the rule-based semantic checker 250 may divide the suggestions 125 into two separate groups. The first group may include "Function(a,b)" and "Function(y,z)" as they each include two parameters in the call. The second group may include "Function(a,b,c)" and "Function(x,y,z)" as they each include three parameters in the call. The rule-based semantic checker 250 can then verify or compare one suggestion 125 from each group to determine whether the suggestions are semantically and/or syntactically correct relative to the specific code base 114 the user 12 is working within. In the illustrated example of FIG. 3 where the structural representation indicates that the function has three parameters 321, 322, 331, the suggestions 125 from the first group are not semantically correct as the structural representation 300 requires three (3) parameters for function 310, while the suggestions 125 from the second group have the correct number of parameters in the call.

In some implementations, when the rule-based semantic checker 250 cannot check each of the autofill suggestions 125 provided by the model 550 within the allotted time budget, the rule-based semantic checker 250 performs a partial check that maximizes coverage of the autofill suggestions 125 given the allotted time budget. For example, the rule-based semantic checker 250 determines groups of autofill suggestions 125 (as described above) and then determines which groups provide the broadest coverage of the entirety of autofill suggestions 125 (e.g., groups with the most autofill suggestions 125). The rule-based semantic checker 250 then checks as many groups of autofill suggestions 125 as possible in the allotted time budget, starting with the largest groups first. In some implementations, the rule-based semantic checker 250 only returns autofill suggestions 125 that are confirmed as correct. In other implementations, the rule-based semantic checker 250 returns all of the autofill suggestions 125, regardless of whether each autofill suggestion 125 has been checked.

The above example is for illustrative purposes and is not intended to be limiting. The rule-based semantic checker 250 may be a deterministic model based on a finite set of rules and not a machine learning model. In turn, the rule-based semantic checker 250 can perform any additional or alternative checks based on the finite set of rules to determine if the suggestions 125 are correct. The finite set of rules can be based on the intended structural representation 300 of the programming code base 114, or on the particular programming language. For example, the rule-based semantic checker 250 verifies, using the set of rules, against an appropriate representation of the programming code base 114 (e.g., the structural representation 300) to determine whether the autofill suggestions 125 are semantically and syntactically correct and/or supported in the programming code base 114. Further, the rule-based semantic checker 250 may also perform any additional or alternative checks, based on the set of rules, to determine whether the code is correct based on the determined particular programming language (e.g., C, C++, Java, Python, etc.).

Figure 4:
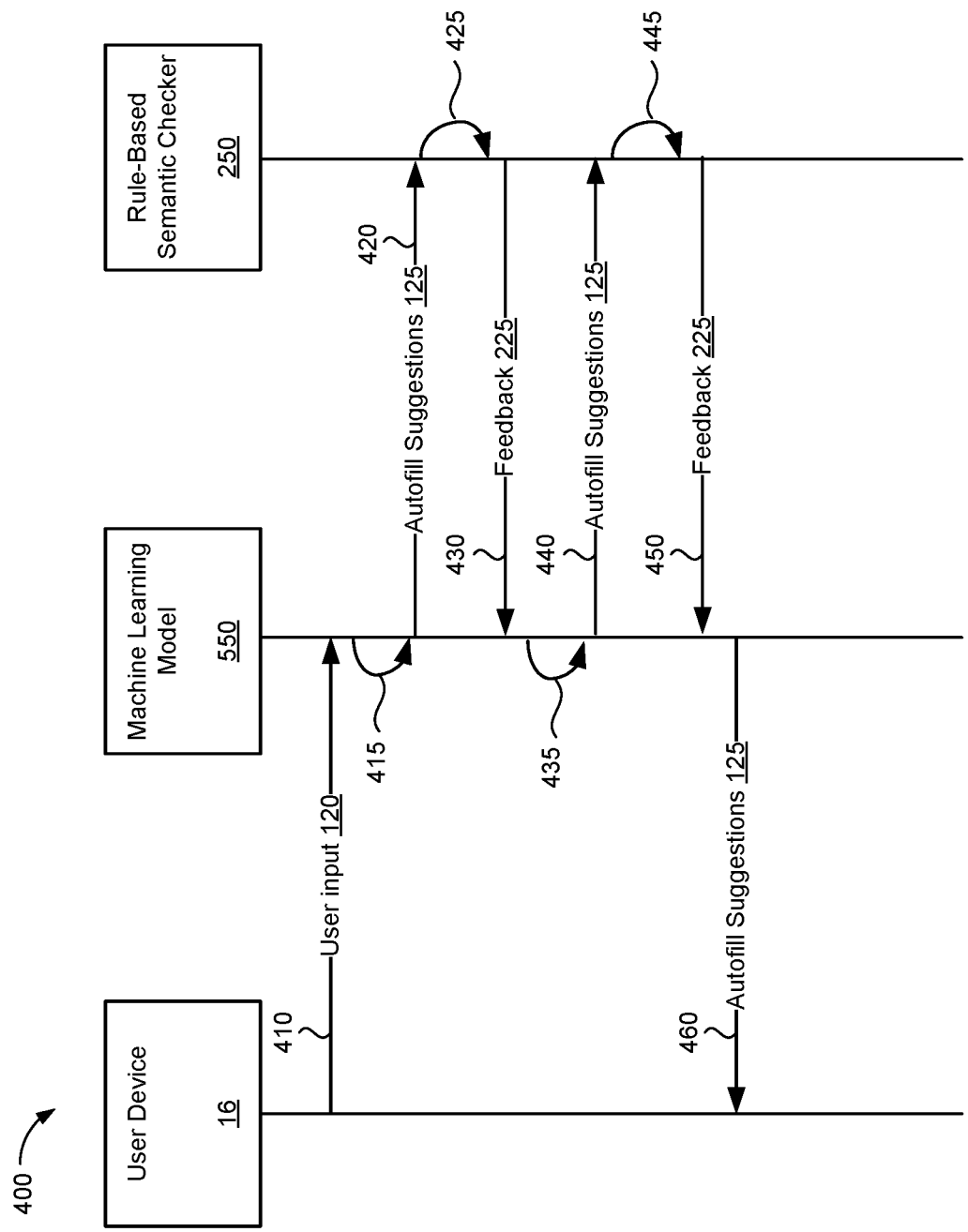
FIG. 4 is a sequence diagram for generating autofill suggestions for code completion in a development environment.

FIG. 4 illustrates an example sequence diagram 400 for providing autofill suggestions 125 for code completion in a development environment 112. In some implementations, the steps 410-460 of the sequence diagram are constrained to be performed within an allotted time budget in order to provide the autofill suggestions 125 to the user 12 while the suggestions 125 are still relevant. When the steps 410-460 cannot be wholly completed within the allotted time budget, the steps 410-460 may only be performed on a portion of the autofill suggestions 125.

The sequence diagram 400 may begin at step 410 by receiving the user input 120. The user input 120 may be received via the user interface 14 of the user device 16. In some examples, the user input 120 is received continuously as a streaming input. For example, as the user 12 continues to enter characters while typing, each new character is considered by the machine learning model 550 when generating autofill suggestions 125 as each additional character eliminates the pool of possible relevant autofill suggestions 125. Upon receiving the user input 120, at step 415, the machine learning model 550 generates one or more autofill suggestions 125 based on the user input 120. At step 420, the machine learning model 550 sends/provides the autofill suggestions 125 to the rule-based semantic checker 250.

At step 425, the rule-based semantic checker 250 determines whether each of the one or more autofill suggestions 125 are semantically and/or syntactically correct based on the development environment 112 and/or the programming code base 114. For example, the rule-based semantic checker 250 compares the autofill suggestions 125 to the structural representation 300 of the programming code base 114. Further, the rule-based semantic checker 250 may also check that the autofill suggestions 125 are in a proper form based on the development environment 112. For example, when a suggestion 125 does not conform to the proper syntax, include proper punctuation, etc., then the suggestion 125 may be determined to be incorrect.

At step 430, the rule-based semantic checker 250 sends feedback to the machine learning model 550. In some implementations, the rule-based semantic checker 250 sends (as feedback) one or more constraints 225 limiting the subsequent suggestions 125 generated or predicted by the machine learning model 550 (i.e., reducing a scope of the possible suggestions the machine learning model 550 may predict). Optionally, the rule-based semantic checker 250 sends (as feedback) back a list of approved suggestions 125 and a list of rejected suggestions 125 to the machine learning model 550. If necessary, based on the feedback, the machine learning model 550, at step 435, generates one or more new suggestions based on the feedback (e.g., the constraints 225) provided by the rule-based semantic checker 250. In some implementations, upon generating a new set of autofill suggestions 125, the machine learning model 550 skips to step 460 and transmits the autofill suggestions 125 for display in the user interface 14 executing on the user device 16. In other implementations, rather than skipping to step 460 after generating the one or more new suggestions 125 at step 435, the machine learning model 550 first sends, at step 440, the new autofill suggestions 125 to the rule-based semantic checker 250. Here, at step 445, rule-based semantic checker 250 checks/verifies the new autofill suggestions 125 to determine if the suggestions 125 are semantically correct. At step 450, the rule-based semantic checker 250 once again provides feedback, which can be in the form of another set of constraints 225 and/or a list of correct suggestions 125 and a list of rejected suggestions 125. In some implementations, when there is at least one correct suggestion 125, the machine learning model transmits the one or more correct suggestions 125 to the user device 16 for display. While in this example, at step 460 the autofill suggestions 125 are transmitted for display at the user device 16, the machine learning model 550 and the rule-based semantic checker 250 may continue to generate suggestions 125 and constraints 225 for any number of cycles. In some implementations, the autofill suggestions 125 are displayed (e.g., via the user interface 14) as a list of selectable options in a drop down menu. In other implementations, a single autofill suggestion 125 is displayed on the user device 16. For example, an autofill suggestion 125 is displayed as a continuation of the user input 120 (i.e., as a continuation of a sequence of text entered by the user 12) but in a different color, font, size, etc. than the original user input 120. In this example, the autofill suggestion 125 appears to automatically complete the code for the user, and the user can either accept or reject the suggestion 125 using further inputs (e.g., if the user hits the "enter" key of a keyboard the autofill suggestion 125 will be accepted, while if the user continues to type the autofill suggestion 125 will disappear or be replaced with a new autofill suggestion 125).

Figure 5:
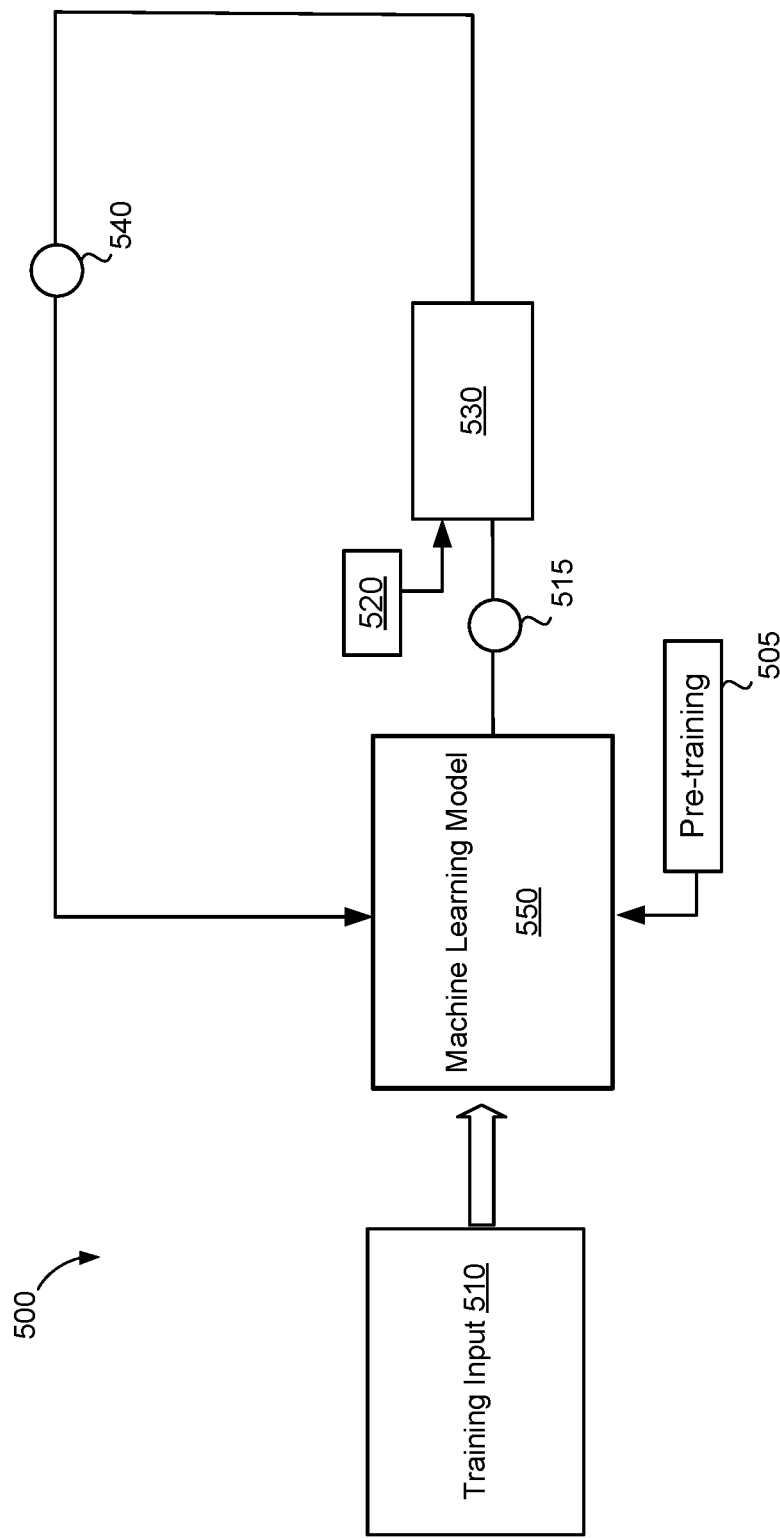
FIG. 5 is a schematic view of an example training scheme for the machine learning model.

FIG. 5 illustrates an exemplary training process 500 for training the machine learning model 550. In some implementations, the process 500 employs a two-step training technique. First, the machine learning model 550 is pre-trained on a large set of code to produce a base model. The machine learning model 550 may then be trained in an iterative fashion based on additional user inputs and feedback. For example, the process 500 starts with pre-training the machine learning model 550 using pre-training data 505. Pre-training a model is a technique used for initializing a model which can then be further fine-tuned based on additional training data 510. For the machine learning model 550, pre-training may include initiating the machine learning model 550 with pre-training data 505 including a large data set including previously written code in one or more programming languages.

The process 500 can then fine-tune parameters of the machine learning model 550. The training process 500 may include feeding training input 510 to the machine learning model 550. In some implementations, the training input 510 includes inputs from one or more users, such as new code. Upon receiving the training input 510, the machine learning model 550 may generate an output 515 (e.g., an autofill suggestion 125). The training inputs 510 may include some or all of the code base 114.

In some implementations, the output 515 is used by a loss function 530 to generate a loss 540. The loss function 530 compares the output 515 and a label 520 to generate the loss 540, where the loss 540 indicates a discrepancy between the label 520 (i.e., ground truth representation of the code) and the output 515 (i.e., the autofill suggestion). The loss function 530 may implement any suitable technique to determine a loss such as regression loss, mean squared error, mean squared logarithmic error, mean absolute error, binary classification, binary cross entropy, hinge loss, multi-class loss, etc. The loss 540 may then be fed directly to the machine learning model 550. Here, the machine learning model 550 processes the loss 540 and adjusts one or more parameters of the machine learning model 550 to account for the loss 540.

In some implementations, the training process 500 occurs in real time. In other words, a user may enter an input in a development environment, which is received as training input 510. The machine learning model 550 may produce one or more autofill suggestions 125 (i.e., output 515) which are provided to the user 12 in response to the user input 120. The user 12 may then either accept one of the autofill suggestions 125 or complete the user input 120 manually. The resulting final code (i.e., the output 515 or the completion entered by the user 12) may be used to label 520 additional training inputs 510 for the machine learning model 550. The loss function 530 may then generate the loss 540 based on the label 520 and the output 515.

Figure 6:
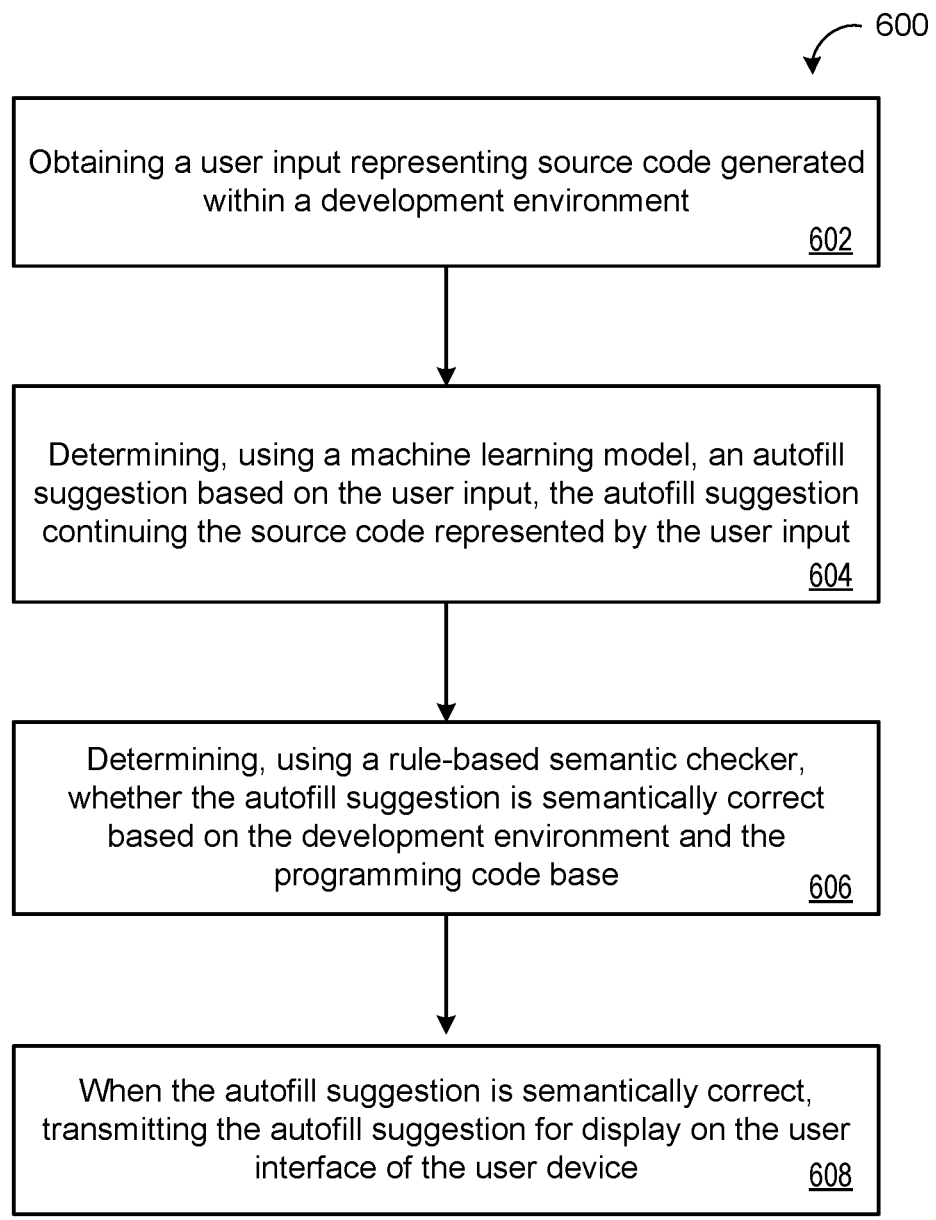
FIG. 6 is a flowchart of an example arrangement of operations for a method of generating autofill suggestions for code completion in a development environment.

FIG. 6 is a flowchart of an exemplary arrangement of operations for a method 600 for providing autofill suggestions for code completion in a development environment. The method 600 may be performed, for example, by various elements of the system 100 of FIG. 1. For instance, the method 600 may execute on the data processing hardware 154 of the remote system 150, the data processing hardware 112 of the user device 16, or some combination thereof. At operation 610, the method 600 includes obtaining, from a user interface 14 executing on a user device 16, a user input 120 representing source code generated within a development environment 112, the source code created using a particular programming language and a programming code base 114. At operation 620, the method 600 includes determining, using a machine learning model 550, an autofill suggestion 125 based on the user input 120. The autofill suggestion 125 continues the source code represented by the user input 120. At operation 630, the method 600 includes determining, using a rule-based semantic checker 250 configured for the particular programming language, whether the autofill suggestion 125 is semantically correct based on the development environment 112 and the programming code base 114. At operation 640, the method 600 includes, when the autofill suggestion 125 is semantically correct, transmitting the autofill suggestion 125 for display on the user interface 14 of the user device 16.

Figure 7:
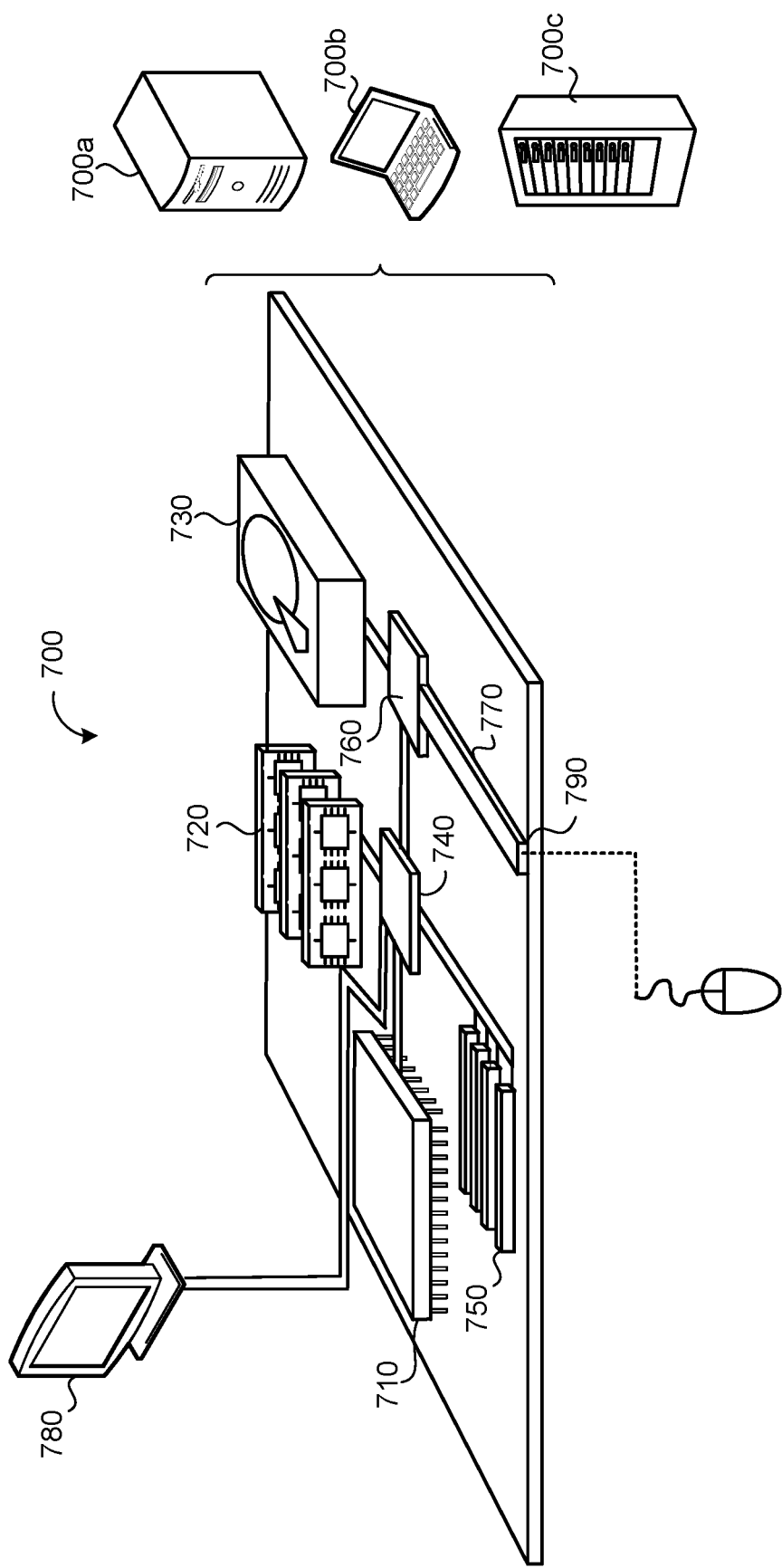
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   obtaining, from a user interface executing on a user device, a user input representing source code generated within a development environment, the source code generated using a particular programming language;
   determining a first autofill suggestion based on the user input, the first autofill suggestion continuing the source code represented by the user input;
   determining, using a rule-based checker configured for the particular programming language, that the first autofill suggestion is syntactically incorrect based on the development environment;
   in response to determining that the first autofill suggestion is syntactically incorrect, generating, using the rule-based checker, one or more constraints based on the first autofill suggestion;
   determining a second autofill suggestion based on the user input and the one or more constraints; and
   in response to determining that the second autofill suggestion is syntactically correct, transmitting the second autofill suggestion for display on the user interface of the user device.

2. The method of claim 1, wherein the operations further comprise determining, using the rule-based checker configured for the particular programming language, that the second autofill suggestion is syntactically correct based on a programming code base.

3. The method of claim 2, wherein determining that the second autofill suggestion is syntactically correct comprises comparing the autofill suggestion to a structural representation of the programming code base.

4. The method of claim 3, wherein the structural representation of the programming code base is an abstract syntax tree.

5. The method of claim 3, wherein the structural representation of the programming code base is stored in a memory cache.

6. The method of claim 1, wherein the rule-based checker determines that the second autofill suggestion is syntactically correct within an allotted time budget.

7. The method of claim 1, wherein the operations further comprise determining the second autofill suggestion using a machine learning model.

8. The method of claim 7, wherein an integration model facilitates communication between the machine learning model and the rule-based checker.

9. The method of claim 1, wherein the operations further comprise determining, using the rule-based checker configured for the particular programming language, that the second autofill suggestion is semantically correct based on the development environment and a programming code base.

10. A system comprising:
    data processing hardware; and
    memory hardware in communication with the data processing hardware, the memory hardware storing instructions that when executed on the data processing hardware cause the data processing hardware to perform operations comprising:
      obtaining, from a user interface executing on a user device, a user input representing source code generated within a development environment, the source code generated using a particular programming language;
      determining a first autofill suggestion based on the user input, the first autofill suggestion continuing the source code represented by the user input;
      determining, using a rule-based checker configured for the particular programming language, that the first autofill suggestion is syntactically incorrect based on the development environment;
      in response to determining that the first autofill suggestion is syntactically incorrect, generating, using the rule-based checker, one or more constraints based on the first autofill suggestion;
      determining a second autofill suggestion based on the user input and the one or more constraints; and
      in response to determining that the second autofill suggestion is syntactically correct, transmitting the second autofill suggestion for display on the user interface of the user device.

11. The system of claim 10, wherein the operations further comprise determining, using the rule-based checker configured for the particular programming language, that the second autofill suggestion is syntactically correct based on a programming code base.

12. The system of claim 11, wherein determining that the second autofill suggestion is syntactically correct comprises comparing the second autofill suggestion to a structural representation of the programming code base.

13. The system of claim 12, wherein the structural representation of the programming code base is an abstract syntax tree.

14. The system of claim 12, wherein the structural representation of the programming code base is stored in a memory cache.

15. The system of claim 10, wherein the rule-based checker determines that the second autofill suggestion is syntactically correct within an allotted time budget.

16. The system of claim 10, wherein the operations further comprise determining the second autofill suggestion using a machine learning model.

17. The system of claim 16, wherein an integration model facilitates communication between the machine learning model and the rule-based checker.

18. The system of claim 10, wherein the operations further comprise determining, using the rule-based checker configured for the particular programming language, that the second autofill suggestion is semantically correct based on the development environment and a programming code base.

19. A non-transitory computer-readable medium encoded with instructions that, when executed by one or more processors, cause the one or more processors to:
  obtain, from a user interface executing on a user device, a user input representing source code generated within a development environment, the source code generated using a particular programming language;
  determine a first autofill suggestion based on the user input, the first autofill suggestion continuing the source code represented by the user input;
  determine, using a rule-based checker configured for the particular programming language, that the first autofill suggestion is syntactically incorrect based on the development environment;
  in response to determining that the first autofill suggestion is syntactically incorrect, generate, using the rule-based checker, one or more constraints based on the first autofill suggestion;
  determine a second autofill suggestion based on the user input and the one or more constraints; and
  in response to determining that the second autofill suggestion is syntactically correct, transmit the second autofill suggestion for display on the user interface of the user device.

* * * * *